(No Model.)
M. S. THOMPSON.
DEVICE FOR FEEDING SALT OR COMPRESSED FEED TO CATTLE.
No. 332,973. Patented Dec. 22, 1885.
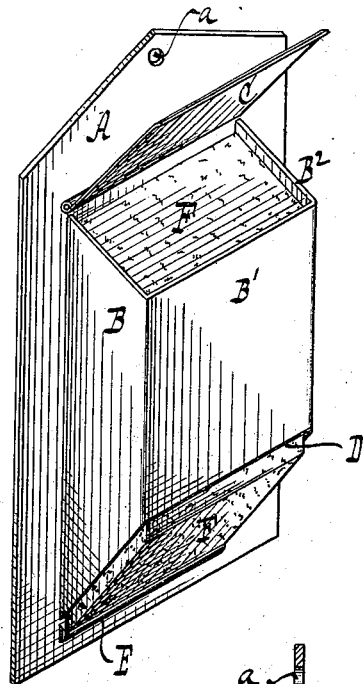
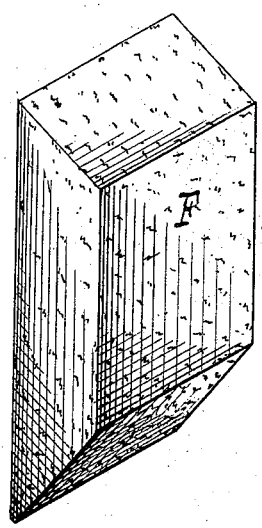
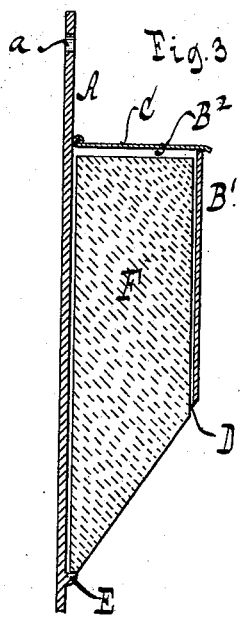
WITNESSES:
Otto Hufeland
William Miller
INVENTOR
Mark S. Thompson
BY
Van Santvoord & Hauff
his ATTORNEYS

UNITED STATES PATENT OFFICE.

MARK S. THOMPSON, OF NEW YORK, N. Y., ASSIGNOR TO HENRY A. LEE, OF SAME PLACE.

DEVICE FOR FEEDING SALT OR COMPRESSED FEED TO CATTLE.

SPECIFICATION forming part of Letters Patent No. 332,973, dated December 22, 1885.

Application filed September 18, 1885. Serial No. 177,471. (No model.)

*To all whom it may concern:*

Be it known that I, MARK S. THOMPSON, a citizen of the United States, residing at New York, in the county and State of New York, have invented new and useful Improvements in Devices for Feeding Salt or Compressed Feed to Cattle, of which the following is a specification.

This invention consists in a hopper in which a block or column of compressed salt or feed is placed, having an oblique opening at its lower end, and a ledge beneath said opening, on which the feed rests.

In the drawings, Figure 1 is a perspective view of my invention. Fig. 2 is a similar view of a block of salt. Fig. 3 is a vertical section.

Similar letters indicate corresponding parts.

In the drawings, the letter A designates the back of the hopper, provided with a hole or other suspension device, $a$. B B' B² are the sides. The top is closed by a cover, C, while the lower end of the hopper has an oblique opening, D. Just below the opening a ledge, E, projects and holds the block of salt F in place and prevents the same from dropping out, while enough of the salt is exposed to permit the animal to lick it.

As the salt is consumed it will drop down of its own weight, and while always within reach of the animal it is kept clean and not liable to be wasted.

What I claim as new, and desire to secure by Letters Patent, is—

The herein-described hopper having an oblique opening at its lower end and provided with a ledge below said opening, substantially as described.

In testimony whereof I have hereunto set my hand and seal in the presence of two subscribing witnesses.

MARK S. THOMPSON. [L. S.]

Witnesses:
   A. FABER DU FAUR, Jr.,
   E. F. KASTENHUBER.